(12) United States Patent
Cohen

(10) Patent No.: US 8,912,418 B1
(45) Date of Patent: Dec. 16, 2014

(54) MUSIC NOTATION SYSTEM FOR TWO DIMENSIONAL KEYBOARD

(71) Applicant: Lewis Neal Cohen, San Diego, CA (US)

(72) Inventor: Lewis Neal Cohen, San Diego, CA (US)

(*) Notice: Subject to any disclaimer, the term of this patent is extended or adjusted under 35 U.S.C. 154(b) by 0 days.

(21) Appl. No.: 14/146,719

(22) Filed: Jan. 2, 2014

Related U.S. Application Data

(60) Provisional application No. 61/751,861, filed on Jan. 12, 2013.

(51) Int. Cl.
*G09B 15/02* (2006.01)
(52) U.S. Cl.
CPC .................................. *G09B 15/023* (2013.01)
USPC ..................................................... 84/483.2
(58) Field of Classification Search
USPC ................. 84/483.1, 470 R, 477, 483.2, 478, 84/718–720, 723, 735
See application file for complete search history.

(56) References Cited

U.S. PATENT DOCUMENTS

| | | | |
|---|---|---|---|
| 104,393 A | 6/1870 | Wright | |
| 4,750,399 A * | 6/1988 | Coles | 84/478 |
| 5,549,029 A | 8/1996 | Lepinski | |
| 6,605,767 B2 * | 8/2003 | Fiks et al. | 84/423 R |
| 7,767,895 B2 | 8/2010 | Johnston | |

* cited by examiner

*Primary Examiner* — Kimberly Lockett

(57) ABSTRACT

A music notation system for a two dimensional keyboard consists of a five line staff per hand, where lines represent black keys and spaces represent white keys. The lines are vertically oriented, and spaced to resemble the pattern of black and white keys in an octave of piano keys. Note-octave symbols are placed on a line or space, indicating which column of keys the desired note is in. A note-octave symbol graphically indicates which row of octaves the desired note is in by the location of a note head on the stem of the note-octave symbol. A horizontal row in the notation represents an instant of time, at a particular subdivision of the beat. Solid horizontal lines indicate measure boundaries. Dashed horizontal lines indicate beat boundaries. The number of subdivisions of a given beat is indicated by the number of rows between the beat boundaries.

17 Claims, 7 Drawing Sheets

MUSIC NOTATION SYSTEM FOR TWO DIMENSIONAL KEYBOARD

CROSS-REFERENCE TO RELATED APPLICATIONS

This application claims the benefit of provisional patent application Ser. No. 61/751,861 filed by the present inventor on Jan. 12, 2013.

FEDERALLY SPONSORED RESEARCH

Not Applicable

SEQUENCE LISTING OR PROGRAM

Not Applicable

BACKGROUND OF THE INVENTION

1. Field

This invention generally relates to music, specifically to a music notation system for a two dimensional keyboard.

2. Background

According to the conventional music notation system, symbols are placed on a series of parallel, horizontal lines, called a staff, to depict tones of the music being visually recorded. The conventional staff consists of five uniformly spaced, horizontal lines and the intervening spaces. Graphic symbols, or notes, are positioned on the staff on a line, in a space between two lines, in the space immediately above the top line, and in the space immediately below the bottom line. A disadvantage of conventional music notation is that there are high and low notes that don't fall on the staff and require ledger lines, which are difficult to read.

An impediment to learning to play the piano is the poor visual correlation between conventional music notation and the conventional piano keyboard. The lines and spaces of the staff do not indicate white vs. black keys. A student must learn to recognize the notes on the staff by name, and then find the associated piano key. She must also learn how to interpret sharps and flats in the key signature, and substitute black keys accordingly during her performance. Note that a given line or space indicates a different note in the bass and treble clefs, causing confusion for musicians. More confusion is added by the fact that a note representing a given pitch that appears on a line in one octave, will appear in a space in the next higher or lower octave, and so forth, thereby constantly altering its appearance. Therefore, the musician cannot with complete ease distinguish a pitch by its location on a conventional staff.

There are also aspects of rhythm notation which are also confusing in conventional music notation. Conventional music notation uses a combination of graphic symbols to indicate note duration. Filled vs. unfilled note heads, the presence and shape of a flag, dots, ties, and time signature all may be used in combination to determine the duration of a note. Dots are small and can be overlooked in a piece of music, leading to errors.

From the foregoing, it can be seen that an operator of a musical instrument using conventional music notation is required to process a significant amount of information using a difficult system in order to produce a musical sound from a musical instrument.

The present inventor disclosed a two dimensional keyboard in provisional patent Ser. No. 61/751,861 and US Patent Application #(SEE INFORMATION DISCLOSURE). That keyboard comprises one or more handboards, where each handboard is intended to be played by one hand, and each handboard has a two dimensional arrangement of keys. The columns are formed by an octave of conventional piano keys. The rows are formed by subdividing the conventional piano keys. First the keys are subdivided into a front key area with wide white keys and optionally thin extensions of the black keys, and a rear key area with white and black keys. The front and rear key areas are each further subdivided into rows of octaves. Two octaves of a note can be played with the same finger, and a hand can span a three octave range.

The two dimensional keyboard has a number of other benefits. It is roughly one third the size of an electronic piano keyboard with the same number of notes. Because it is two dimensional, it is easier to represent it as a graphic on a tablet, cell phone, television, or other device. It can be paired with a strummer to make a guitar-like instrument. It has ergonomic features that make it easier to play by touch than a piano. It organizes musical notes by octave and scale degree to improve music learning. In order to fully realize the benefits of the two dimensional keyboard, a companion two dimensional music notation system is needed.

BRIEF SUMMARY OF THE INVENTION

The notation system of the present invention is used for teaching and playing music on a two dimensional musical keyboard. The notation consists of a five line staff per hand, where lines represent black keys, and spaces represent white keys. The lines are typically vertically oriented, and spaced to resemble the pattern of black and white keys in an octave of piano keys. Note-octave symbols are placed on a line or space, indicating which column of keys the desired note is in. Columns represent letter names or scale degrees of notes. A note-octave symbol also graphically indicates which row of keys the desired note is in by the vertical location of a circle, triangle or other shape, on the stem of the note-octave symbol. A note-octave symbol may indicate more than one octave should be played in a column.

A horizontal row in the notation represents an instant of time, at a particular subdivision of the beat. Solid horizontal lines indicate measure boundaries. Dashed horizontal lines indicate beat boundaries. The number of subdivisions of a given beat is indicated by the number of rows between the beat boundaries. The number of subdivisions is chosen on a per-beat basis as the minimum number required to transcribe the rhythm in a beat of the song being learned. Thick vertical dashes in rows following a note-octave symbol indicate that the note is sustained.

Various additional aspects, features, and functions are described below in conjunction with the appended Drawings.

DETAILED DESCRIPTION

Two Dimensional Keyboard

Figure 1:
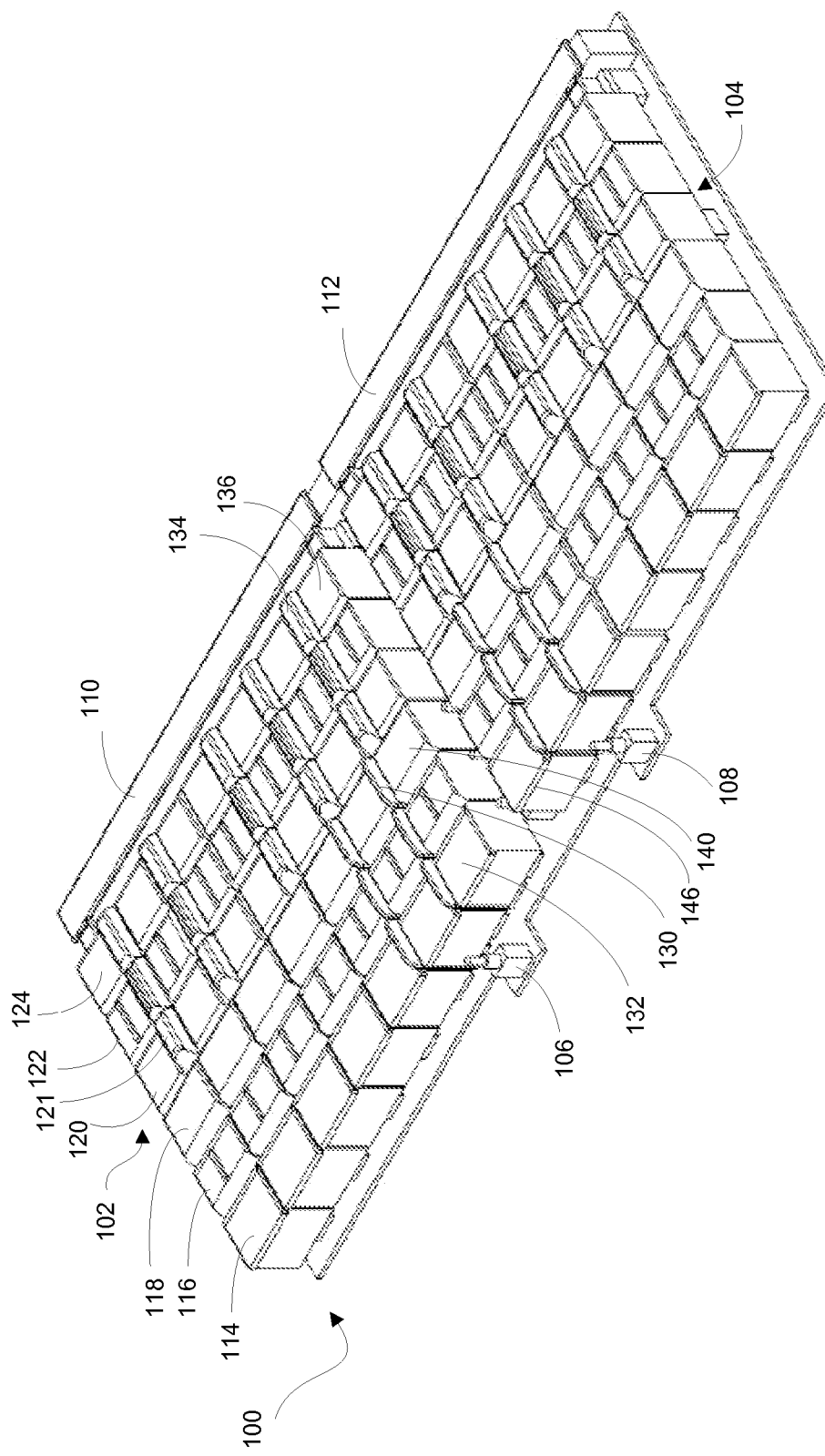
FIG. 1: Perspective view of a two handboard two dimensional keyboard compatible with the present music notation system invention

The present music notation system invention is for use with a two dimensional keyboard, by the present inventor. For the purpose of illustrating the correspondence between the notation system and keyboard, a description of a two dimensional keyboard will precede the description of the present invention. A two dimensional keyboard is illustrated in FIG. 1. A two hand keyboard assembly 100 is comprised of a left handboard 102 and a right handboard 104. Left handboard 102 has a front key area, whose front left corner is the first key in the front row 114, which is nominally tuned to "C" in the diatonic C major scale. The rear right corner of the front key area of left handboard 102 is the last key in the rear row 140, which is nominally tuned to "B". Left handboard 102 has a rear key area, whose front left corner is the first key in the front row 120, which is nominally tuned to "C". The rear right corner of the rear key area of left handboard 102 is the last key in the rear row 136, which is nominally tuned to "B". A three octave handboard has dimensions that are chosen such that the player can simultaneously depress key 132 with his left hand thumb and key 124 with his left hand pinky. A column of keys should be roughly the same size as its equivalent piano key. Referring to FIG. 1, tops of keys 114,116,118,120,122,124 should have the same combined dimensions as a C key on a conventional piano. The black keys are similarly subdivided. Key 121 is at the front of the C sharp column of black keys in rear key area of left handboard 102. A column of black keys may optionally be extended into the front key area. Black or raised keys in the front key area are thinner than their equivalent keys in the rear key area. Black key 134 has an equivalent narrow raised key 130 in the front key area. Both keys would have the same pitch assigned.

The left handboard has an octave up switch actuator 110, at the rear of the handboard, and an octave down switch 106. The right handboard has an octave up switch actuator 112, at the rear of the handboard, and an octave down switch 108.

Figure 2:
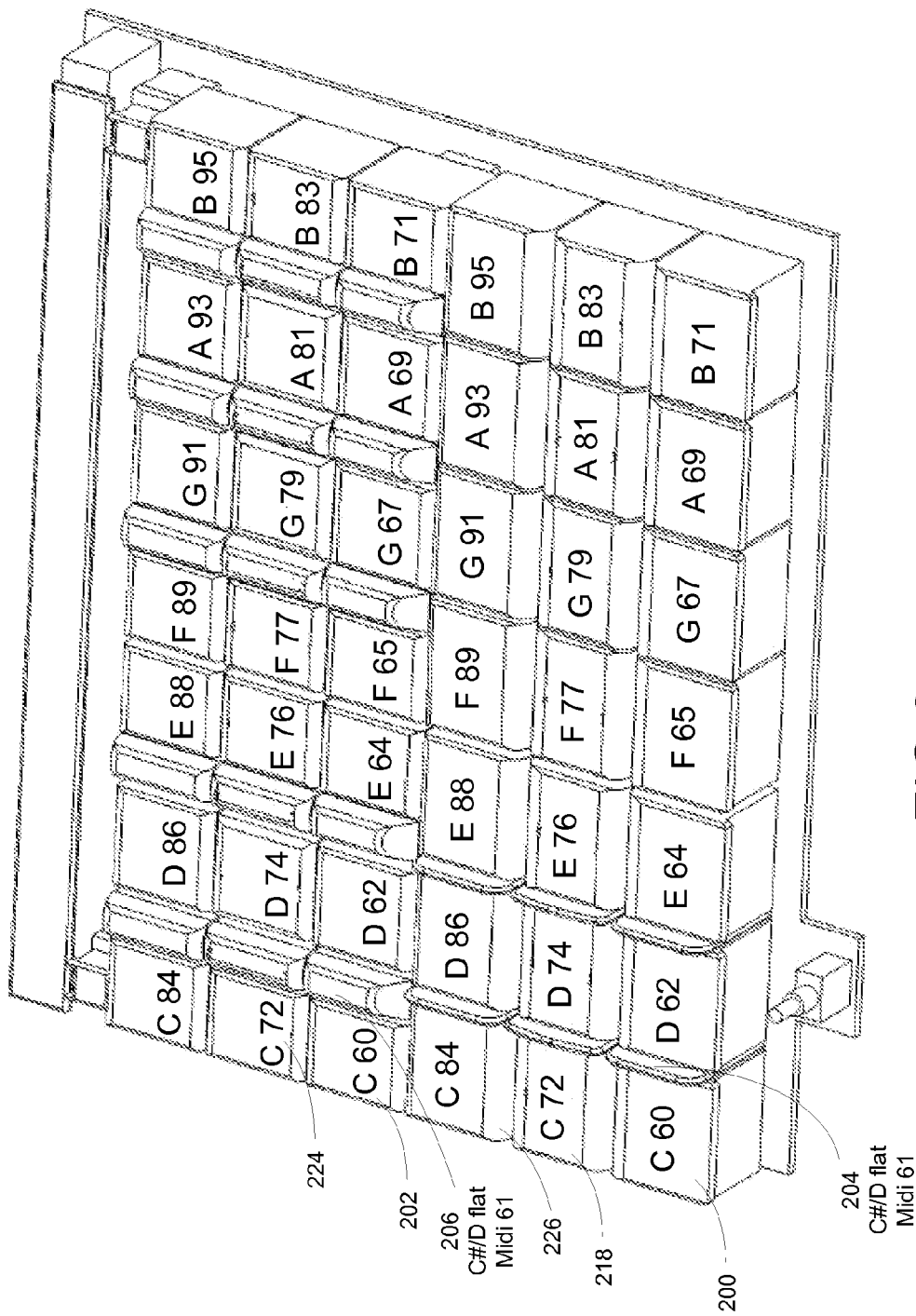
FIG. 2: Perspective view of a right handboard of a two dimensional keyboard tuned to the key of C, showing note assignments

Referring to FIG. 1 and FIG. 2, keyboard 100 is operated by placing the left hand over left handboard 102, and placing the right hand over right handboard 104. In accordance with the song to be performed, the player depresses keys in the front key area of the right or left handboard with his right or left thumb, and depresses keys in the rear key area of the right or left handboard with the other four fingers of his right or left hand, respectively. FIG. 2 shows a right handboard overlaid with note names and MIDI note numbers. The MIDI note numbers are shown to distinguish which octave of a particular note will be played. For a note with MIDI note number N, a note an octave higher will have MIDI note number N+12, and a note an octave lower will have MIDI note number N−12. MIDI note numbering is according to the chromatic scale, so a note a semitone higher than MIDI note N, will have MIDI note number N+1. It can be seen from FIG. 2 that columns contain octaves of a note, and rows contain some or all of the notes in one octave of a chromatic scale. Rows of octaves are duplicated in the front and rear key areas. The rows in a key area will be referred to as low octave, middle octave, and high octave from front to back, respectively. The note C (midi note 60) appears in the low octave rows, and can be played on key 200 with the right thumb or key 202 with the right index finger. In a similar manner, note C#/D flat (midi note 61) is duplicated, and can be played on narrow black key 204 with the right thumb or key 206 with the right index finger. The duplication of notes ensures that a comfortable fingering can be found for most musical phrases. A chamfer, gap, or beveled edge 226 on the front of a key provides tactile feedback to the thumb that it is crossing the gap between two octaves of the same note. By pressing the thumb along chamfer 226, the musician can actuate two octaves of the same note (high octave C midi 84 and middle octave C midi 72 on key 218). Two octaves (middle C midi 72 and low C midi note 60) can also be played by the index finger pressing the chamfer between key 202 and key 224. In this manner any one finger can produce two notes, an octave apart, if they are in the tuning range of a handboard.

Both handboards are tuned to the same note, but different octaves. For example the left handboard 102 key 114 could be tuned to C (midi note 36) and the right handboard 104 key 146 could be tuned to C (midi note 60). In this case the highest note on the left handboard would be B (midi note 71). The notes in the octave from C (midi note 60) to B (midi note 71) would be present on both handboards. Based on the musical score, or personal preference, the player could use either hand to play these notes. During performance, it is sometimes necessary to shift the tuning of a handboard up or down an octave, to allow access to the highest or lowest notes available on a conventional piano keyboard. To tune the right handboard up an octave, the octave up actuator 112 is pressed. At this point in time, all keys on the right handboard are redefined an octave higher. Notes that are already sounding remain at their current pitch until released. The octave down switch 108 causes the right handboard to be tuned down an octave. In the preferred embodiment, each handboard has its own octave up and down switch, and octave changes last until the next octave up or down switch actuation.

Figure 7:
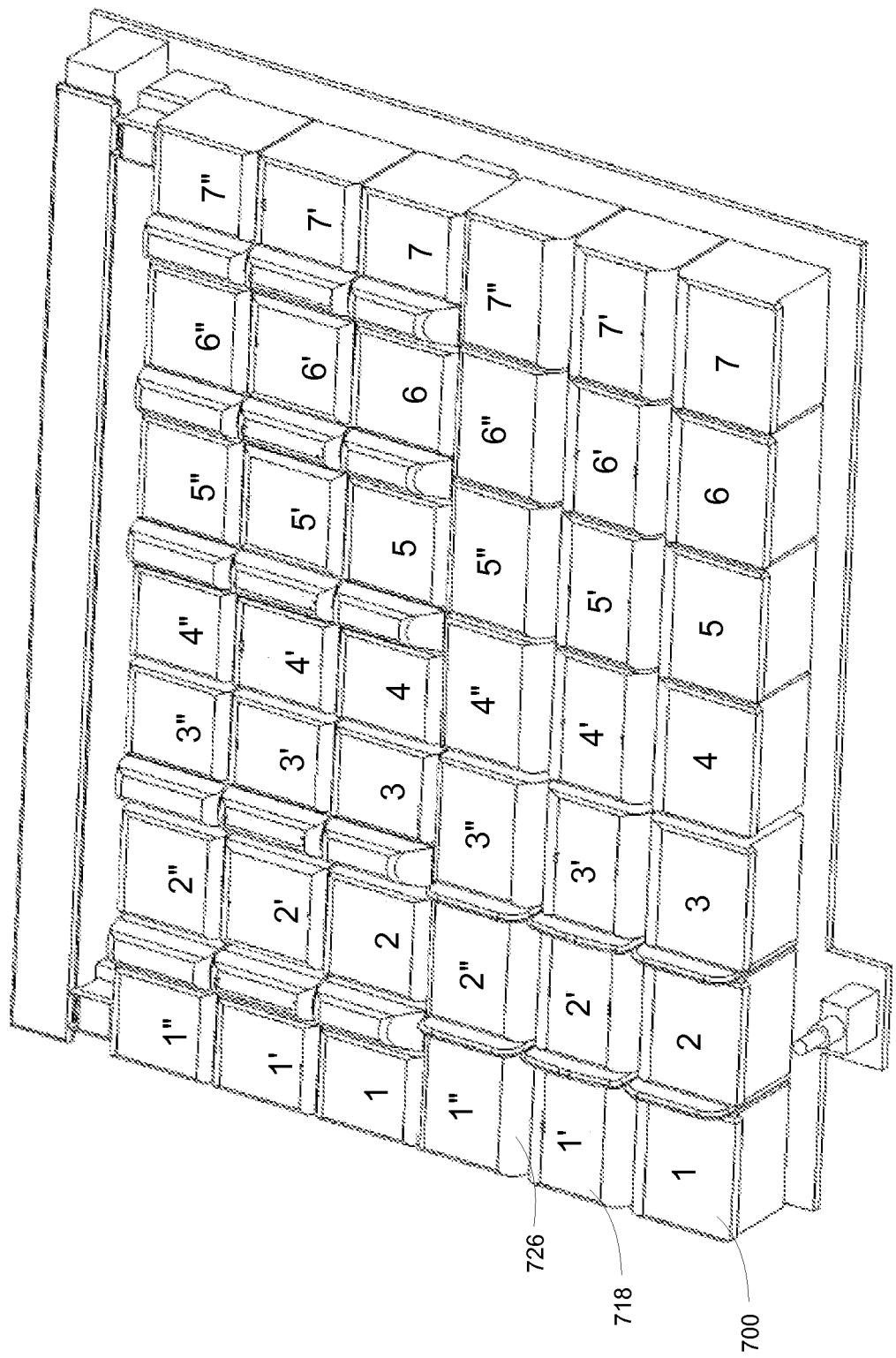
FIG. 7: Right Handboard of a two dimensional keyboard, showing scale degree of note assignments

The two dimensional keyboard should be understood to be a keyboard where all pitches are assigned relatively, to maintain the same interval relationships between keys as those shown in FIG. 2, regardless of the starting pitch of root key 114. FIG. 7 shows a right handboard with each key labeled with the scale degree of its note in the major scale whose root is assigned to root key 700. Key 700 is marked "1" to indicate it is the root of the major scale. A single quote mark is used to indicate a note is one octave higher than the note in the same column of the first row. A double quote mark is used to indicate a note is two octaves higher than the note in the same column of the first row. Accordingly key 718 represents a pitch one octave higher than root key 700, and key 726 represents a pitch two octaves higher than root key 700. It can be seen from FIG. 7 that three octaves of a particular scale degree are in the same column, whereas they would be separated by fourteen white keys on a conventional piano. This grouping by octaves is valuable for teaching melodies and chords in terms of scale degrees. Other graphic symbols could be used instead of the single and double quotes to indicate which octave a note belongs to. In one embodiment the root key 700 is always tuned to C, allowing the fingering to most closely match that of a conventional piano keyboard. In another embodiment, the root key 700 is tuned to the root of the musical key of the song to be played, allowing the scale degree of each note in the song to be determined most easily learning purposes, and resulting in the easiest fingering for songs in a major scale.

Notation System

Figure 4:
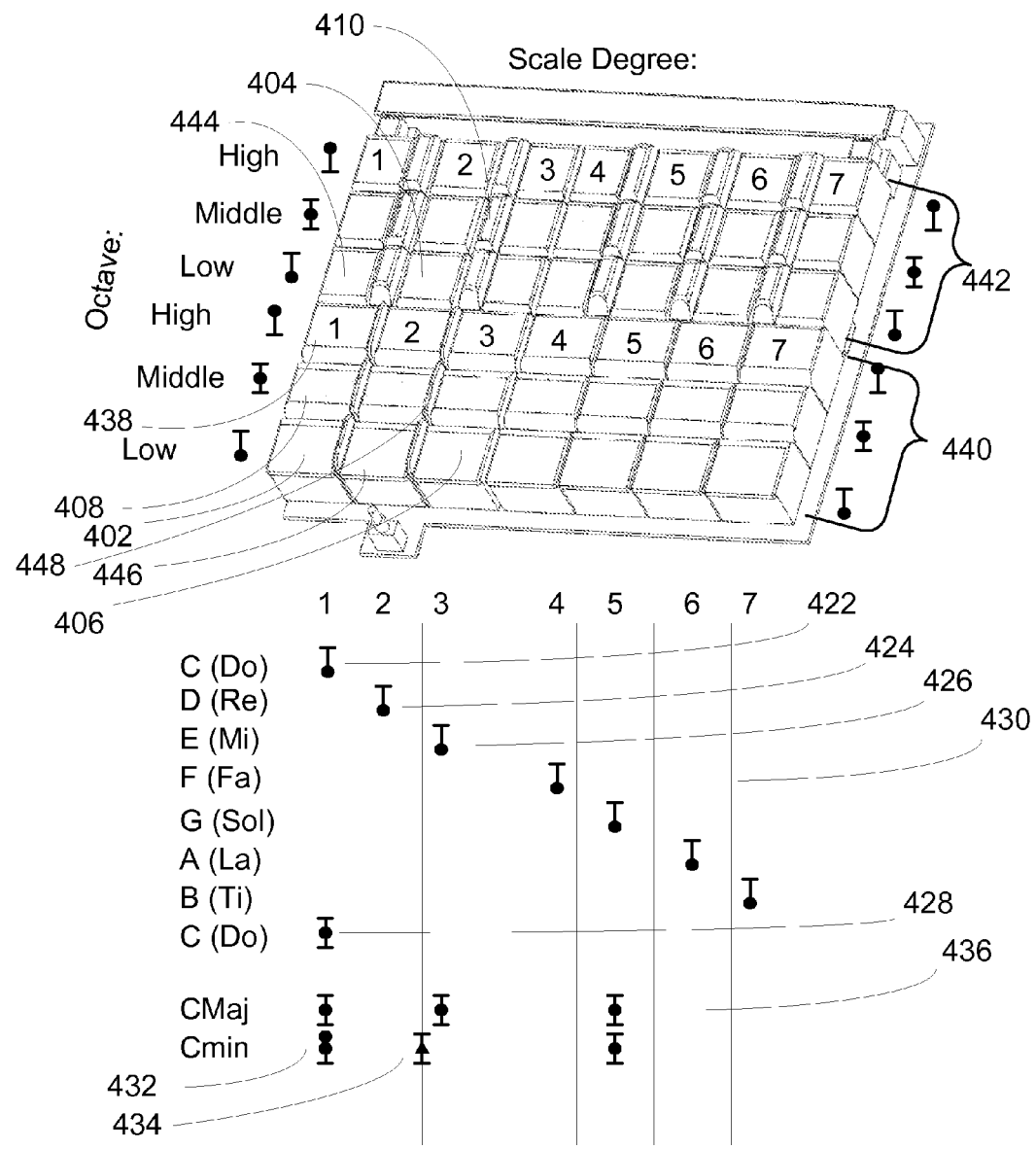
FIG. 4: Mapping between single notation staff of present notation invention and Right Handboard of a two dimensional keyboard

FIG. 4 shows the present invention in relation to a right handboard of a two dimensional keyboard. In my notation system, a five line staff is used to represent each handboard. A vertical staff line 430 represents a column of black keys. The particular vertical staff line indicated by 430 represents the black keys with scale degree 6 sharp or 7 flat, or A sharp, B flat, for a handboard with root key 402 tuned to C. A space is defined as the white area to the left or right of a staff line. Each space represents a column of white keys. A space 424 between the first and second staff lines, counting from left to right, indicates the column of white keys tuned to the second scale degree.

FIG. 3 shows the construction of a note octave symbol, and a few illustrative examples. A note-octave symbol is used to indicate the actuation of one or more octaves of a given note or scale degree. Referring to FIG. 3A, each note-octave symbol has a short vertical line or note stem 302. A round filled circle or round note head 300 is placed in one of three possible locations along note stem 302. The placement of the note head indicates which octave should be actuated. A "note on" or note actuation occurs when the key indicated by the notation is pressed. FIG. 3B shows some note on events for a three octave handboard. A note on for the highest octave or rear row 308 has the note head 300 at the top of the note stem 302. A tail or note alignment mark 304 is placed at the bottom of the note stem 302 to give a visual reference for determining the position of the note head. In the case of a note on for the lowest octave or front row 312, the note alignment mark is at the top of the note stem. In the case of a note on for the middle octave 310, note alignment marks are placed at either end of the note stem. A distinctive triangular note head is used to indicate notes corresponding to black keys, which fall on a staff line. FIG. 3B shows a note on symbol for the highest octave 314, middle octave 316, and lowest octave 318, respectively of a black key. If two or three octaves of a note must be struck simultaneously, this is indicated by adding more than one note head to the note stem. FIG. 3C shows some common examples. A note-octave symbol showing the middle and high octaves of a white key is shown in 320. A note-octave symbol showing the middle and high octaves of a black or raised key is shown in 324. A note-octave symbol showing the middle and low octaves of a white key is shown in 322. A note-octave symbol showing the middle and low octaves of a black key is shown in 326. Alternate embodiments with note-octave symbols capable of indicating note actuations in more than three octaves are possible, by increasing the length of note stem 302. Any other graphic symbol that conveys which octave rows are to be actuated is considered to be a note-octave symbol, in the spirit of the present invention.

Figure 3A:
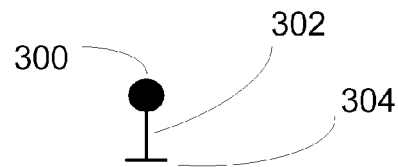
FIG. 3: Note-Octave Symbol Graphical Construction in the preferred embodiment of the present music notation invention
Figure 3B:
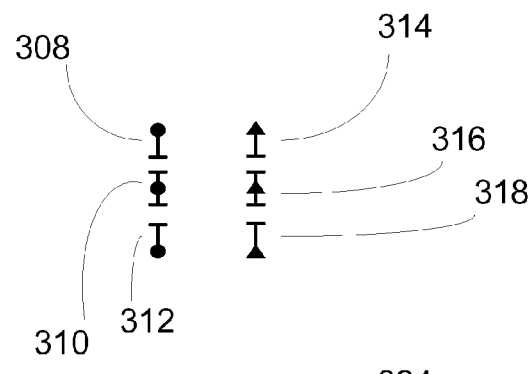
Figure 3C:
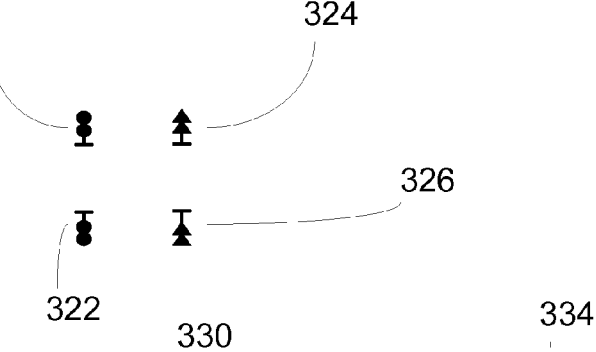
Figure 3D:
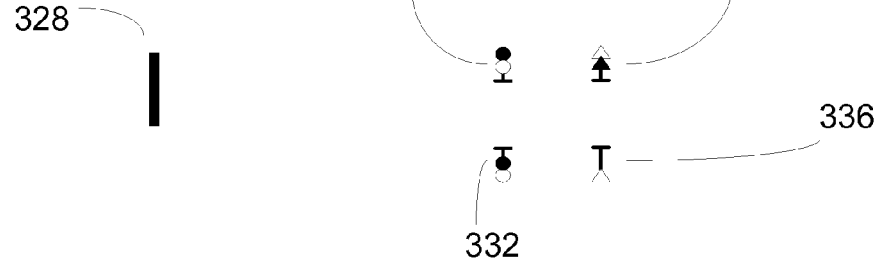

A hollow or unfilled note head is used to indicate that a particular octave of a note is sustained while some other octave is actuated or released. Referring to FIG. 3D, a round hollow middle note head 330 is used to indicate that the middle octave of a white key is sustained, at the same time the high octave is actuated. This can be accomplished with one finger on the keyboard of the present invention, by sliding the finger from a middle octave key across the chamfer of an upper octave key of the same scale degree. Two fingers may also be used, or a sustain pedal in combination with pressing the high octave key. Similarly, note-octave symbol 332 indicates the low octave of a white key is sustained, while the middle octave is struck. Note-octave symbol 334 shows the high octave of a black key sustained, while the middle octave is played. The hollow triangular note head on note-octave symbol 336 indicates that the low octave is held. In the notation system of the present invention, any combination of filled and unfilled note heads can be present on the note stem of a note-octave symbol, to indicate the desired musical tones. An all active octave sustain symbol 328 formed by a wide dash or bold vertical line segment is located directly below a note-octave symbol to indicate that any octaves of a scale degree that were actuated or sustained previously, continue to be sustained in the current time interval.

FIG. 4 shows the relationship between a major scale and some chords in the present notation invention, and a two dimensional keyboard. The upper part of FIG. 4 shows a right handboard of a two dimensional keyboard, divided into a front key area 440, and a rear key area 442. Symbol 422 designates the low octave of the root or $1^{st}$ scale degree key 402 or 444. Symbol 424 designates the low octave of the $2^{nd}$ scale degree key 404 or 446. A preferred fingering for the scale would be to play key 402 with the thumb, key 404 with the index finger, key 406 (note-octave symbol 426) with the thumb, then use the remaining four fingers on the front row of white keys in rear key area on the $4^{th}$, $5^{th}$, $6^{th}$, and $7^{th}$ scale degrees. The last note in the scale is the root played in the middle octave 428, preferably played by the thumb on key 408. The C major chord 436 would be played using the thumb on key 408, and the middle finger and pinky playing the $3^{rd}$ and $5^{th}$ scale degrees in the middle row of the rear key area 442. The C minor chord has the middle and high octaves of the root shown in note-octave symbol 432. These would be played by placing the thumb on the chamfer between keys 408 and 438. The flat $3^{rd}$ scale degree in the middle octave (note-octave symbol 434) would be played by the index finger on key 410. In some other musical situation, the flat $3^{rd}$ scale degree could be played by the thumb on key 448.

Figure 5:
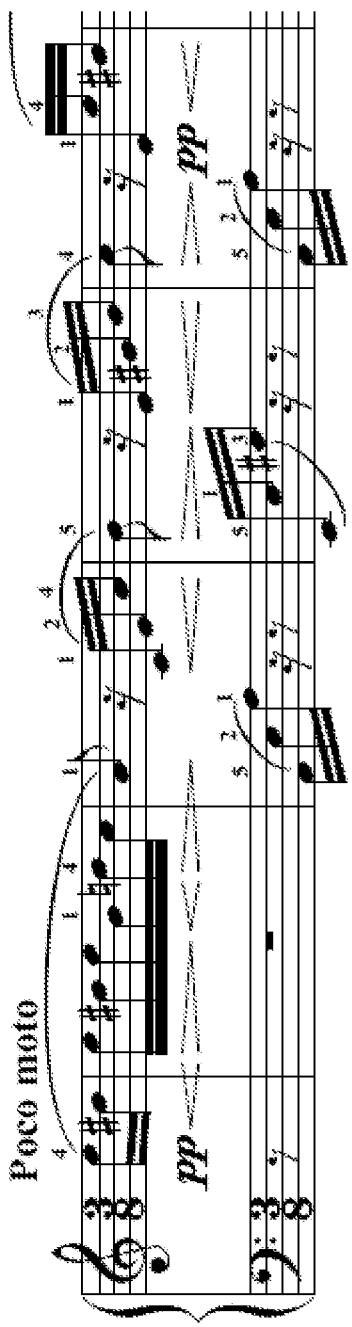
FIG. 5: Measures 1-5 of Fur Elise by Ludwig Van Beethoven in conventional music notation (PRIOR ART)
Figure 6:
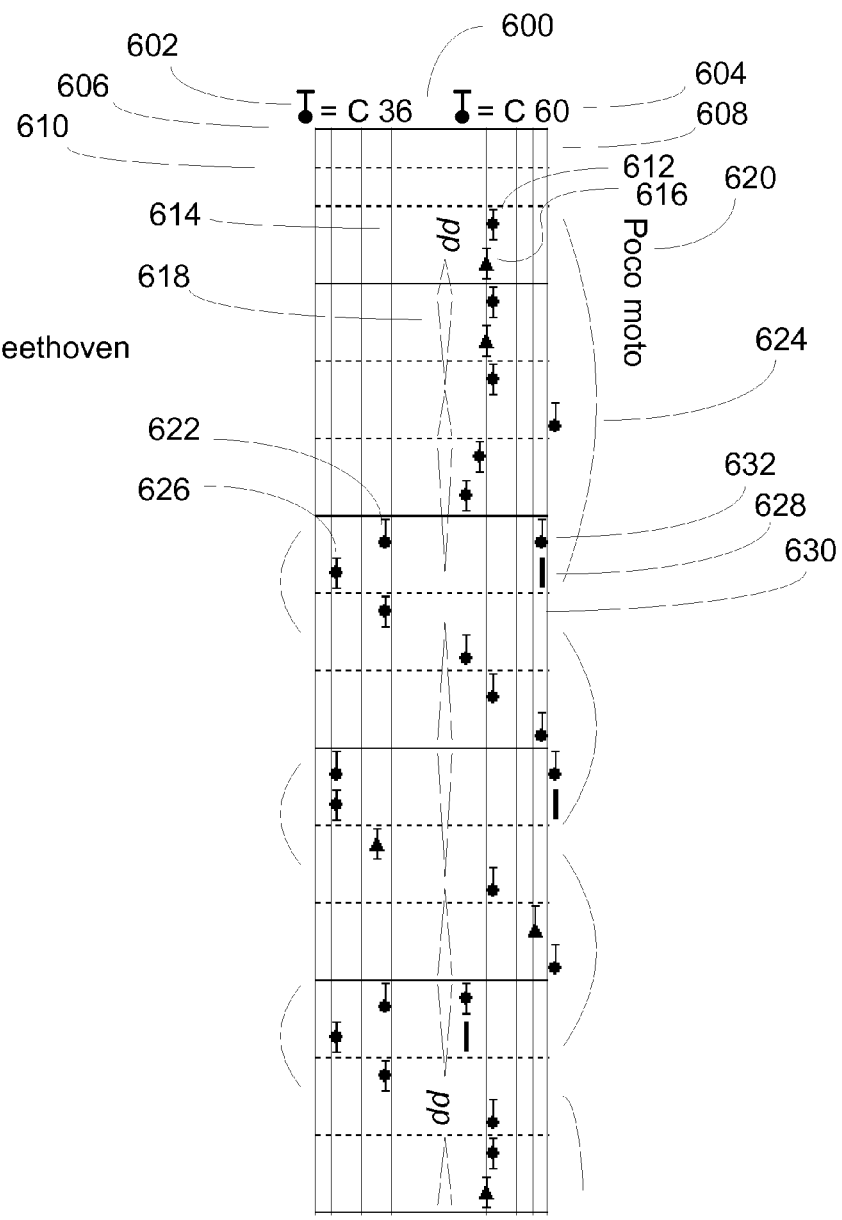
FIG. 6: Measures 1-5 of Fur Elise by Ludwig Van Beethoven in notation system of the present invention

FIG. 5 shows the first five measures of Beethoven's Fur Elise in conventional music notation, for reference. FIG. 6 shows the first five measures of Beethoven's Fur Elise in the notation system of the present invention. A grand staff 600 is formed by joining a 5 line left hand staff and a 5 line right hand staff. A solid horizontal line 606 is used to represent the start of a measure. A dashed horizontal line 610 represents the start of a beat. The duration of any note-octave symbol within a particular beat is the same, and is visually determined by the distance between the horizontal lines defining that beat. The distance reflects the number of subdivisions of the beat needed to notate the highest resolution event in either staff. If there is one note-octave symbol between the lines it is a note of duration one beat. If there are two note-octave symbols (vertically) between the beat lines, the resolution is one half beat. For example, the third beat of Fur Elise has resolution of one half beat. The middle octave of the third scale degree 612 is played on the beat, and the middle octave of the flat third scale degree 616 is played one half beat later. In popular music, the most common values of subdivisions per beat are: 1, 2, 3, and 4. Other values of beat subdivisions are possible. If no note-octave symbol is shown on a particular line or space, all octaves of that scale degree are silent. If a staff doesn't contain any note-octave symbols for a beat, then a one beat rest is implied, as shown in the first beat of Fur Elise 608. There is no need of an explicit symbol for a rest in my notation system. Two notes 622 and 626 are present in the left hand staff for the $1^{st}$ beat of the third measure. This sets the number of subdivisions per beat to two for both the left and right staff. To represent a one beat note in the right hand during the $1^{st}$ beat of the third measure, a note-octave symbol 632, followed by a sustain all active octaves symbol 628 are used. The number of subdivisions of a particular beat is determined using both hands or staffs. In the second beat of the third measure 630, the left hand plays a note on the first half of the beat, and the right hand plays a note on the second half of the beat. Each note is of one-half beat duration.

My notation system supports articulation and dynamics information, in a manner similar to conventional music notation. Referring to FIG. 6, the notation system can convey:

tempo markings 620, dynamics markings 614, hairpins 618, and slurs 624. Other markings and lyrics could also be displayed in a similar manner.

A left handboard tuning indication 602 is placed above the 1$^{st}$ measure of the left hand staff. The tuning indication is placed such that the note-octave symbol, which shows the lowest octave actuated, aligns with the space to the left of the first staff line, indicating scale degree 1 or the key in the lower left of a left handboard key area. To complete the tuning indication, an equals sign "=" followed by a note letter, followed by a midi note number is shown. Left handboard tuning indication 602 shows the left handboard tuned to C (midi note 36). A right handboard tuning indication 604 shows the right handboard tuned to C (midi note 60). FIG. 2 shows a right handboard tuned in accordance with right handboard tuning indication 604. The tuning indication could contain frequency, octave number or other methods of identifying a note beside midi note number. A symbol, for example an up or down arrow is placed next to a staff, to indicate the musician should press the octave up actuator or octave down switch for a handboard. The octave change symbol should be located in the time between the last note at the present octave, and the first note at the new octave.

In the present invention, finding which key to play consists of the following three steps for each hand:
1. Find the correct column of white or black keys based on the line or space.
2. Decide whether to play the note in the front key area with the thumb, or in the rear key area with one of the other four fingers, based on current and upcoming notes.
3. Find the correct row based on the placement of the note head in the note-octave symbol.

Accordingly, the reader will see that by using the music notation system of the present invention in combination with a two dimensional keyboard, the task of sight reading a piece of music is greatly simplified.

The compact two dimensional layout of the keyboard invention makes it particularly well suited to implementation on a touchscreen device. In this case, mechanical keys are replaced by key regions displayed on the touchscreen. A music learning system can be achieved by simultaneously displaying the music notation of the present invention and the two dimensional keyboard.

In an alternate embodiment of the present invention, the display may scroll, for gaming, music learning, or entertainment purposes. In another embodiment, measure numbers, distinctive symbols, or changes in background may be interspersed to give the user a sense of location within a song. This will be helpful when the notation is displayed on small screens, where only a small snippet of a song can be displayed. The aspect ratio of certain screens, for example smart phone screens, may dictate that the staff is oriented horizontally. Any orientation of the staff, and any direction for the flow of time should be considered to be within the scope of the present invention. Similarly, other note head shapes, or note-octave symbol shapes, or colors may be found to be beneficial for readability or other reasons.

Different colors or shapes may be applied to selected note heads. In one embodiment, the highest voice, or any voice which should be played louder, or accented, has a distinctive note head shape or color. In another embodiment, two hands may be notated on a single staff by using color, note head shape, or other means for distinguishing them. In another embodiment, different instruments can be notated on the same staff, and distinguished by using color, note head shape, or other means. Overlaying multiple instruments in this manner will be particularly useful in musical analysis and composition. In embodiments where the instrument is tuned to the root of the musical key of the composition, a note's location is also its scale degree, significantly simplifying musical analysis and composition. The notation system could therefore be used to teach vocal performance, music theory, analysis, or composition, without a two dimensional keyboard. In an alternate embodiment, the same note head shape may be used for black and white keys. In another embodiment, numbers or colors, or a graphic of the hand can be added to provide suggested fingering information. The solid and dashed lines denoting measure and beat boundaries, respectively can be replaced by any other method of graphically distinguishing beats from measures, for example thick lines to denote measures, and thin lines to denote beats.

In an alternate embodiment of the notation system, a staff indicating handboard fingering can be paired with a companion staff or graphical symbol indicating strumming, fingerpicking, bowing, wind mouthpiece technique, or other note actuation and articulation gestures.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention. In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

The invention claimed is:

1. A method for operating a keyboard to produce sound from a musical instrument, the method comprising the steps of:
providing a musical instrument comprising a two dimensional keyboard having white and black or raised keys, the keys being arranged in a matrix with keys in a column producing sound of different octaves of a note, the musical instrument being operative for producing sound of different pitches by depressing different of the keys;
providing a visually observable staff comprising substantially parallel lines operated in two distinct and separate groups of lines, wherein a first group consists of two lines separated by a first distance and a second group consists of three lines substantially evenly spaced at a distance substantially equal to the first distance, wherein the first group and the second group are separated by a second distance that is larger than the first distance;
wherein spaces next to the lines of the staff represent a first plurality of the pitches, which correspond to pitches produced by depressing white keys in white key columns of the keyboard and the lines of the staff represent a second plurality of the pitches corresponding to pitches produced by depressing black keys in black key columns of the keyboard; and
wherein a note-octave symbol represents a plurality of octaves of a note, which correspond to pitches produced by depressing keys in rows of a particular column of the keyboard;
providing a plurality of note-octave symbols visually depicted in any of the spaces or on any of the lines of the staff to represent pitches of a musical composition which could be produced by depressing keys of the keyboard; and depressing, on the musical instrument, keys of the keyboard corresponding to the pitches represented by the note-octave symbols visually depicted on the staff, with a white key being depressed when a note-octave symbol appears in one of the spaces of the staff and a raised or black key being depressed when a note-octave symbol appears on one of the lines of the staff, whereby a sound is produced by the musical instrument.

2. The method of claim 1, wherein a first portion of note-octave symbols are each depicted as being located on a line and a second portion of note-octave symbols are each depicted as being located in a space adjacent to a line, and each note-octave symbol in the first portion has a different appearance than each note-octave symbol in the second portion.

3. The method of claim 1, wherein a first plurality of lines perpendicular to the staff indicate measures, and a second plurality of lines perpendicular to the staff indicate beats, and lines in the first plurality of lines are different in appearance than lines in the second plurality of lines.

4. The method of claim 1, wherein the music is visually represented on a paper medium.

5. The method of claim 1, wherein the music is visually represented on a computerized display, tablet computing device, cell phone, gaming, or music learning system.

6. The method of claim 5, wherein the visually represented music is scrolling or moving on the computerized display.

7. The method of claim 1, further comprising the steps of: providing a first five line staff for a left hand, providing a second five line staff for a right hand, and visually depicting note-octave symbols representing musical notes to be played by the left hand on the left hand staff, and visually depicting note-octave symbols representing musical notes to be played by the right hand on the right hand staff.

8. The method of claim 1, wherein the five lines of the staff are oriented substantially vertically.

9. The method of claim 1, wherein the note-octave symbol comprises a line or stem parallel to the staff, one or more note heads, and one or more lines or tails perpendicular to the staff.

10. The method of claim 9, further comprising setting the color of a note head to a distinctive color, if the note head represents a particular voice of interest in a piece of music.

11. The method of claim 1, further comprising placing an octave up or an octave down symbol beside the staff.

12. The method of claim 1, further comprising placing a master tuning indication beside the staff.

13. The method of claim 1, further comprising placing a plurality of symbols indicative of guitar strumming direction and timing beside the staff.

14. The method of claim 1, further comprising placing unique graphical tokens beside the staff, whereby a musician can more easily ascertain his location in a musical piece.

15. The method of claim 1, further comprising placing measure numbers beside the staff.

16. The method of claim 1, further comprising placing articulation and dynamics markings beside the staff.

17. A computer readable memory comprising computer code for implementing a method for operating a keyboard to produce sound from a musical instrument, the method comprising the steps of:

providing a musical instrument comprising a two dimensional keyboard having white and black or raised keys, the keys being arranged in a matrix with keys in a column producing sound of different octaves of a note, the musical instrument being operative for producing sound of different pitches by depressing different of the keys;

providing a visually observable staff comprising substantially parallel lines operated in two distinct and separate groups of lines, wherein a first group consists of two lines separated by a first distance and a second group consists of three lines substantially evenly spaced at a distance substantially equal to the first distance, wherein the first group and the second group are separated by a second distance that is larger than the first distance;

wherein spaces next to the lines of the staff represent a first plurality of the pitches, which correspond to pitches produced by depressing white keys in white key columns of the keyboard and the lines of the staff represent a second plurality of the pitches corresponding to pitches produced by depressing black keys in black key columns of the keyboard; and wherein a note-octave symbol represents a plurality of octaves of a note, which correspond to pitches produced by depressing keys in rows of a particular column of the keyboard;

providing a plurality of note-octave symbols visually depicted in any of the spaces or on any of the lines of the staff to represent pitches of a musical composition which could be produced by depressing keys of the keyboard; and depressing, on the musical instrument, keys of the keyboard corresponding to the pitches represented by the note-octave symbols visually depicted on the staff, with a white key being depressed when a note-octave symbol appears in one of the spaces of the staff and a raised or black key being depressed when a note-octave symbol appears on one of the lines of the staff, whereby a sound is produced by the musical instrument.

\* \* \* \* \*